United States Patent Office 3,418,134
Patented Dec. 24, 1968

3,418,134
AROMATIZING FOOD CONCENTRATES
William A. Rooker, 112 E. Piccadilly,
Winchester, Va. 22601
No Drawing. Continuation-in-part of application Ser. No. 301,639, Aug. 12, 1963. This application Dec. 17, 1964, Ser. No. 419,232
13 Claims. (Cl. 99—23)

ABSTRACT OF THE DISCLOSURE

Adsorb released volatile aromatics on porous activated charcoal prior to their deterioration in the preparation of concentrates from coffee, tea, or cocoa. The released volatiles are recovered from at least one conventional processing step where volatiles are released. The adsorbed aromatics are extracted from the charcoal by a solvent having a boiling point between 32° F. and 10° F. and returned to the concentrate.

This is a continuation-in-part of application Ser. No. 36,752, filed June 17, 1960, and application Ser. No. 301,639, filed Aug. 12, 1963, both now abandoned This invention relates to the preparation of beverage food products. More particularly, it relates to processes for producing coffee, cocoa, tea, and like products characterized by an improved aroma and flavor.

The preparation of instant coffee is typical of one aspect of the invention and will be described for purposes of illustration, but it should be understood that this is merely illustrative of a preferred application of the invention and is not to be construed as limitative.

It is common knowledge that the flavor and aroma of coffee brewed from a batch of freshly roasted and ground coffee is superior to the flavor and aroma of coffee brewed from the same batch of coffee after it has been stored for any considerable period after roasting and grinding. This is merely a readily observed manifestation of what is experienced daily by a host of coffee drinkers and merely confirms the known belief that the aromatic or fragrance-imparting constituents of roasted coffee have relatively low boiling points and are highly volatile, that immedately after roasting coffee begins to lose its aroma, that even in so short a period as an hour or two an appreciable loss of aroma is evident, and after the roasted coffee is ground, the aromatic substances begin to undergo undesirable chemical changes to further increase the loss of true coffee aroma.

One object of the present invention is to provide a process for preparing concentrates of food products such as coffee, tea, cocoa, and the like with improved flavor and aroma.

Another object of the invention is to provide a process wherein the volatiles which contribute to flavor and aroma are recovered before deterioration during at least one of the conventional processing steps for such food products, and wherein the volatiles recovered at any one or all stages of the process are entirely or in part returned to the food product or added to another food product, so that products of full natural or controllably altered flavor and aroma may be produced.

A further object of the present invention is the provision of a particular filter for adsorbing the aromas and volatiles that emanate from conventional processing of a beverage food product and of a solvent extraction process which desorbs the filter of the aromas and volatiles with minimum retention within the filter.

Another object of this invention is to provide a process for sorbing volatile-containing aromatics released during conventional processing of a natural fruit or vegetable product, such as the production of a concentrate of such fruit or vegetable, and particularly completing such sorption in a medium before substantial deterioration of the aromatics, such as may occur by oxidation, hydrolysis, or other chemical change, and also substantially maintaining the integrity of aromatics after the sorption.

These and other objects and the manner of obtaining the improved products which constitute another aspect of my invention will become better understood from the description which follows:

In the usual processes of manufacture of instant coffees, for instance, the green coffee beans are first roasted to develop color and flavor. Then the roasted beans are ground or cut to the desired mesh or particle size for efficient extracting. Then a water extract is made from the ground beans. The extract may or may not be partly concentrated before drying. Lastly, the extract is dried and the resulting dry material is the instant coffee of commerce. In such a process of manufacture, the volatile-aromatic constituents of the coffee are lost and a beverage prepared from the finished product often has a flat, insipid flavor.

The excessive losses of the volatile aromatics which accompany the usual processes of manufacture of instant coffees have been of serious concern to the instant-coffee industry for many years, and accordingly various procedures have been developed or suggested for trapping the volatile aromatics and for returning them to the finished instant coffee.

For example, with one procedure an inert gas such as nitrogen is passed through the coffee while it is being ground. The gas picks up some of the volatile aromatics. Then the gas is passed through a mass of instant coffee for the purpose of imparting some aroma or bouquet to the instant coffee. At best, only a slight improvement results, for if the inert gas removes aroma from the coffee being ground, it will likewise carry the aroma away from the instant coffee through which it is being passed.

Another procedure is to make the coffee extraction in a closed vessel to prevent the escape of the volatile aromatics. After the extraction is completed, an inert gas such as nitrogen is passed through the extractor. The gas is then passed through a condenser and the moisture in the gas is condensed into a distillate containing the volatile aromatics. The distillate is either added directly to the instant coffee or the volatile aromatics are washed out with ether and the ether extract is added to the instant coffee. Then sufficient heat is applied to the mass to drive off the ether and the volatile aromatics supposedly remain in the instant coffee. Only a limited improvement results in the aroma of the finished product, since a major portion of the volatile aromatics are not recovered in the procedure described, due to losses inherent in each step and also additional appreciable losses may accompany the heating required to remove all traces of ether from the finished instant coffee.

With still another procedure which has been practiced, live steam is passed through the coffee prior to making the extraction and the steam is then condensed. The resulting distillate contains the volatile aromatics. Ether is mixed with the distillate to extract the volatile aromatic from the water in the distillate. Then the ether layer is decanted from the water layer and the ether layer containing the extracted volatiles is added to the instant coffee. Sufficient heat is applied to the mass to drive off all traces of the ether and the volatile aromatics supposedly remain in the instant coffee. Again only a limited improvement results, since a considerable portion of the total of volatile aromatics is not recovered and appreciable losses accompany each step of the process, including the heating required to free the instant coffee from all traces of the ether.

In another known procedure, the coffee extract is partly concentrated under vacuum and the initial vapors from the evaporator are fractionated and condensed to give a distillate containing the volatile aromatics. The distillate is then added to anhydrous dextrose which will take up, without excessive lumping, approximately 9 percent of its weight of the distillate. The impregnated dextrose is then added to the instant coffee. With this method the aromatic-bearing distillate does not exceed 180 fold, i.e., one pound of the distillate contains the volatile aromatics from not more than 180 pounds of freshly brewed coffee beverage. So with a holding capacity of 9 percent of distillate, the impregnated dextrose is only 16 fold. To obtain a beverage having a satisfactory color and base-coffee flavor, the impregnated dextrose must not exceed 20 percent by weight of the instant coffee to which it is added to avoid an unacceptable over-sweetened taste. Hence, a beverage prepared from such a mixture can, at best, contain no more than 4 percent of the volatile aromatics normally present in a beverage brewed from freshly roasted coffee, and the aromatic substances undergo undesirable chemical changes while retained by the dextrose.

In the procedures described above, it has been indicated that considerable portions of the volatile aromatics are not condensed with the water when a distillate is prepared. This is easily confirmed by the fact that the effluent vapors or gases from the distillate-collecting vessels are always strong in coffee aroma. Furthermore, in the presence of so much water, ether will not completely remove the volatile aromatics from the distillate. This is also easily confirmed by noting the strong coffee aroma that remains in the residual water after the ether layer has been completely decanted from the water layer. Warming the instant coffee to drive off all traces of the ether may be accompanied by appreciable losses of the volatile aromatics.

Other processes have been used which attempt to improve a food beverage such as coffee by sorbing undesirable constituents of the natural vegetable matter. For instance, U.S. Patent No. 2,875,063, to Feldman, discloses a method for removing hydrogen sulfide by using activated charcoal, although there is no attempt to return any collected volatiles to the solid product. It follows, therefore, that there would be no improvement in the aroma or flavor of the final product.

In U.S. Patent No. 1,930,257, to Stelkins, a process is set forth which uses activated carbon to remove caffaine from coffee by mixing the carbon with the ground coffee and permitting the mixture to be stored. The Stelkins process cannot sorb the coffee aromatics on the charcoal with such a mixture without deteriorating or destroying the coffee flavor and aroma, since the aromatics would not be collected quickly enough. The Stelkins process, however, intentionally seeks to avoid collection of the aromatics, to return any volatiles that may have been absorbed by the charcoal during the processing of the coffee or during its admixture with the ground coffee by suggesting the carbon and ground coffee combination to an infusion process. In fact, however, these volatiles will not be released during infusion, but rather the carbon will further pick up volatiles, and in this manner continue the degrading of the quality of the coffee product and produce a stale, bitter product. To prove that there is no release of volatiles from the carbon during infusion, it was found by experiment that when ground coffee and carbon are mixed and stored for a period of time, the volatiles sorbed by the carbon will not upon extraction contain any recognizable coffee taste or flavor. Further, when this mixture of carbon and coffee is brewed, the carbon will further sorb slowly about four (4) times as much additional volatiles from the brew, rather than release any of the previously sorbed volatiles. Again, upon extraction, there is no recognizable coffee aroma or taste contained in these volatiles.

In my experimental work I have found that none of the previously proposed procedures described above are really effective for trapping and returning to a coffee product a substantial portion of the volatile aromatics normally lost in preparing a coffee concentrate.

The volatile aromatics of coffee are adversely affected by heat, oxidation, and hydrolysis. They are also so highly volatile and have such low boiling points that it is most difficult to prevent appreciable losses even during the various recovery and reincorporating methods described above. Nor, in the various suggested procedures, is the very important fact recognized that the volatile-aromatic losses are not confined to a single processing step or operation. Nor has it been fully understood that the volatile aromatics which exhibit a pronounced tendency to leave the coffee at any step of the process are no identical in flavor or chemical composition with those present at preceding or subsequent processing steps, possibly because of the effect of each processing step on the material being processed. Most significantly it was not recognized that time is a critical factor in collecting the volatiles in order to preserve them in a manner which will prevent deterioration or other chemical change to occur in the aromatics contained in the volatiles. Thus, the volatiles containing the desirable aromatics must be drawn into a collector or filter as promptly as possible.

It has been found that to produce a full-flavored product, it is desirable to recover as quickly as possible the volatile aromatics at every step in the process where they are evolved, namely: immediately after roasting and during the grinding, the extracting, and the concentrating prior to drying, but that an improved product is obtained if the volatile aromatics are recovered and returned from only one such step, and the volatile aromatics must be recovered as completely and efficiently as possible in a concentrated form which can be returned to the product.

Further, it has been found that to be effective, a workable procedure should provide for mixing the concentrated volatile aromatics and the coffee in the presence of an inert gas and at a temperature sufficiently low to prevent or minimize volatile-aromatic losses.

Briefly in the process devised by me the volatile aromatics are recovered before deterioration from at least one stage of the processing of the beverage food product, in high yield and in concentrated form by adsorbing the volatile aromatics on a solid adsorbent from which they may readily be removed.

Specifically, I have discovered that suitable activated charcoal has an exceedingly high affinity for the volatile aromatics of coffee, and notably will also preserve and immobilize the aromatics sorbed on the charcoal, thus preventing deterioration or chemical changes to occur. In fact, a suitable charcoal will retain up to 50 percent of its weight of the volatile aromatics without any substantial deterioration or chemical change while having very little affinity for water vapors. The volatile aromatics present in freshly brewed beverage coffee are of the order of 30 p.p.m. So one pound of the charcoal may hold or entrap the volatile aromatics from 16,000 pounds of freshly brewed beverage coffee.

A preferred charcoal successfully used in the practice of this invention is one commercially identified as "Absorbit Activated Charcoal Type EH-2," prepared to high density from coconut shell and produced to the following specifications:

Mesh size 6 x 8
90 to 95% $CCl_4$ activity to saturation
Moisture content—5% maximum
Activity rating 75 minutes accelerated chlorpicrin test to breakthrough point (U.S. Govt. Test)

It is an important aspect of the present invention that the volatiles and the aromatics contained as a part of the volatiles be prevented from undergoing deterioration or chemical change due to oxidation, hydrolysis, etc. It has been found that if these volatiles and the accompanying aromatics can be sorbed by activated charcoal before any substantial changes can occur to the aromatics, the aromatics can be desorbed from the charcoal and returned to the concentrate to noticeably enhance the flavor and aroma of the product. The time lapse between the sorption by the charcoal and the release of the aromatics from the coffee or other vegetable matter being processed must not exceed one hour, during which the maximum allowable deterioration of the aromatics will occur, but preferably the aromatics should be sorbed by the charcoal within about one minute after release from the vegetable, or after release from the equipment containing the vegetable.

In order to achieve the timely sorption of the aromatics there should be induced gaseous movement of the aromatics and volatiles toward the charcoal. This induced movement is most easily obtained by suction or lower relative pressure in the direction of the charcoal than at the environment of the source of the aromatics. Introduction of an inert gas also may be used as a carrier to transport the aromatics quickly to the charcoal. In essence, therefore, any means which delivers to the charcoal, in less than one hour and preferably within one minute, the aromatics from the closed system will achieve the purposes of this invention.

As soon as the volatiles are sorbed by the charcoal, they are immobilized and protected from any substantial deterioration and are released only by extraction with a solvent or steam.

The charcoal's low affinity for water vapor makes for an efficient volatile-aromatic extraction with a solvent. The physical nature of the charcoal, being granular and of uniform mesh or particle size, permits a Soxhlet type of extraction, whereby there may be effected a complete recovery of the volatile aromatics with the minimum of solvent.

Also, because of the physical nature of the charcoal, the residual solvent is easily removed from the charcoal by live steam or by boiling the charcoal in water, so that the charcoal may be used over and over again, with consequent economy.

In practicing the invention, the saturation point of the charcoal is easily noted from the odors coming from the charcoal beds or chambers. When the effluent vapors or gases from the charcoal carry an appreciable coffee odor or aroma, the charcoal is saturated. In actual processing two charcoal beds or chambers are arranged in parallel. By simply changing valves, a fresh batch of charcoal is made immediately available when a bed being used becomes saturated and ready for the solvent extraction.

Any solvent which will remove the volatile aromatics in a concentrated form from the charcoal and has a boiling point between 32° F. to 110° F. and permits a substantially complete separation of the solvent and the volatile aromatics by fractional distillation without appreciable loss of the aromatics is suitable for my purpose. Organic solvents which have been found suitable include the chlorofluoromethanes such as: dichloromonofluoromethane, trichloromonofluoromethane, and dichlorotetrafluoromethane, methylene chloride, ethyl chloride and ethyl ether. The chlorofluoromethanes are preferred, since they are not only odorless and tasteless, but effect the most desorption of the charcoal. Of these chlorofluoromethanes, dichloromonofluoromethane is the most desirable.

Preferred methods for practicing this invention as applied to the processing of coffee are as follows:

I. RECOVERY OF THE AROMATICS DURING GRINDING 2100 grams of roasted coffee beans were cut or ground in a Waring Blendor. 210 grams were cut in each batch, so 10 batches were required to cut the 2100 grams of coffee beans.

The Waring Blendor was tightly sealed and had a vent connected to a vacuum pump. Between the blender and the pump was a glass tube containing 10 grams of the charcoal.

During the cutting operations, a 1-2 inch vacuum was maintained on the outlet end of the charcoal tube, so all of the coffee aromatics within 30 seconds after being given off during the cutting of the 2100 grams of coffee beans had to pass through the charcoal bed.

At the end of the cutting operations, the inlet end of the charcoal tube had a strong coffee odor, but the outlet end was odor free.

Using a Soxhlet extraction on the charcoal and a fractional distillation on the solvent, dichloromonofluoromethane, 1.53 grams of aromatics were recovered.

The 1.53 grams of aromatics were added to 575 grams of a presently available commercial instant coffee.

Coffee beverages were prepared as follows: 1.75 grams (1 teaspoonful) or (a) instant coffee fortified with the added aromatics, and (b) non-fortified instant coffee were dissolved in separate cups, each containing 200 cc. of water at 205° F.

A six-member taste panel considered the aromatic-fortified instant coffee to be superior to the non-fortified commercial instant coffee, their opinion being that the beverage prepared from the fortified instant coffee had a pronounced fresh-coffee fragrance and flavor that was lacking in the beverage prepared from the non-fortified instant coffee.

It should be understood that the recovered aromatics may originate from any coffee beans being ground, and then these aromatics may be added to any extract previously formed, as described above, or the aromatics may be returned to an extract made from the coffee beans from which the aromatics originated.

II. RECOVERY OF AROMATICS DURING BREWING

The coffee extractions or brews were conducted in a closed vacuum flask. A glass tube containing 45 grams of the charcoal was attached to the outlet of the flask. The charcoal tube was connected to a vacuum pump, but between the tube and the pump were a condenser and a receiving flask.

The 45 grams of charcoal was used for three batches of brews. Each batch was processed as follows:

700 grams of ground coffee was added to 2100 cc. of water at 160° F. in the flask. With the system closed, the batch was held at 160°–170° F. for 30 minutes, during which time only a slight amount of aromatics were released, but due to the closed system, only a minimum deterioration occurred.

Then the batch was warmed to 190° F. and the pump was started. The batch was held at 185°–195° F. for 60 minutes. During the 60-minute period, a low vacuum was held on the system and the aromatic vapors were drawn within 30 seconds of release through the charcoal bed. The vapors from the charcoal bed were condensed and formed 950 cc. of distillate, or 15 percent of the 6300 cc. of water used in the three brews.

After the 3 extractions or brews, the inlet end of the charcoal tube had a pungent coffee odor, but the outlet end was odor free. The distillate condensed from the vapors which passed through the charcoal bed was also odor free.

Using a Soxhlet extraction on the charcoal and a fractional distillation on the solvent, ethyl ether, 12.16 grams of aromatics were recovered.

The 12.16 grams of aromatics were added to 575 grams of a presently available commercial instant coffee.

Beverages were prepared in separate cups by dissolving 1.75 grams of (a) the instant coffee fortified with the aromatics and (b) the non-fortified instant coffee.

A six-member taste panel considered the aromatic-fortified coffee to be markedly superior to the non-fortified coffee, their opinion being that the beverage prepared from the fortified instant coffee was markedly superior in coffee aroma and flavor to the beverage prepared from the non-fortified instant coffee.

III. RECOVERY OF AROMATICS FROM SEVERAL PROCESSING STEPS (a) The green coffee beans are roasted to develop color and flavor and the freshly roasted coffee is conveyed under a suitable enclosed hood, so that the volatile aromatics can be drawn off rapidly and passed in less than a minute after release through a charcoal bed. The quantity of volatile aromatics lost at this point is not substantial, but in order to obtain a coffee with a superior flavor and aroma, these volatile aromatics should be recovered. A small suction fan draws the volatile aromatics from the hot roasted coffee to and through the charcoal chamber. With sufficient suction there is very little, if any, volatile-aromatic seepage into the surrounding atmosphere and the aromatics are passed to the charcoal as soon as formed. Preferably the freshly roasted coffee is conveyed to the grinder in an enclosed conveyor from which volatile aromatics may be withdrawn into a charcoal absorption bed by a fan or suction device.

(b) Next the coffee is ground. The coffee grinding equipment should be hooded, or otherwise so closed, that all vapors and gases leaving the equipment will likewise pass through a charcoal bed under sufficient suction to prevent volatile-aromatic seepage into the surrounding atmosphere. During the grinding operation an inert gas such as nitrogen may be introduced into the grinding equipment. Again, sufficient suction is maintained on the grinding equipment to prevent volatile-aromatic seepage into the surrounding atmosphere.

In one run 10 grams of activated charcoal was packed in a glass tube 6.5 inches long and 0.5 inch inside diameter. The packed tube was connected between a Waring Blendor and a suction pump. While maintaining a vacuum of between 1 and 2 inches on the outlet end of the packed charcoal tube, 240 grams of roasted whole coffee beans were cut for three minutes. The aromatics were drawn within 15 seconds after release from the Waring Blendor and adsorbed by the charcoal from which they were later recovered.

Following the cutting of the whole coffee beans in the Waring Blendor, the inlet end of the charcoal tube had a pronounced coffee odor, while the outlet end of the charcoal tube was found to be free of such odor, indicating the charcoal had sorbed all of the coffee aromatics that had passed through the charcoal.

After the roasted coffee beans had been cut or ground to the desired particle size for efficient extraction, a substantial portion of the volatile aromatics still remained in the coffee, which could be lost during the subsequent steps, but these aromatics are recovered, in accordance with the present invention, in the extraction and concentration steps which follow.

The extraction of the coffee essence from the ground, roasted coffee may be accomplished by any of several known procedures without departing from the intended scope of the present invention, which is directed to the recovery of the volatile aromatic remaining in the ground roasted coffee and to the return to the extract of these volatile aromatics, along with those trapped in previous steps of the process.

Thus, in the experiment described above, the glass tube packed with charcoal was connected between a vacuum flask and a condenser, the condensate receiving flask of which was connected to a suction pump. The vacuum flask was charged with the 240 grams of cut coffee from the Waring Blendor and 1500 cc. of warm (205° F.) water was added to the cut coffee. The flask was placed on a water bath at about 205° F. and brewed for 30 minutes at 205° F., while all the aromatic vapors leaving the flask passed through the charcoal tube and were adsorbed therein.

At the end of the 30 minute brewing period, a 27 to 28 inch vacuum was drawn on the flask and the coffee brew was subjected to a vacuum distillation until 240 cc. or 16 percent of the original 1500 cc. of added water was recovered as distillate. During the vacuum distillation the aromatic bearing vapors from the coffee brew passed through the charcoal prior to being condensed.

In another mode of practicing this portion of the process, dry steam may be passed through the ground coffee prior to making the extraction. The resulting vapors, consisting of steam plus volatile aromatics are preferably passed directly through a charcoal bed to separate the aromatics from the steam, or the separation may be effected less directly by condensing the steam-aromatic vapors and percolating the condensate through a charcoal bed in which the aromatics will be adsorbed. In either procedure the volatile aromatics may be extracted from the charcoal bed by solvent extraction, using methylene chloride in a Soxhlet extractor, for example.

In still another alternative extraction, the ground coffee is extracted in the usual way, except that the extraction is performed in a closed vessel to prevent the escape of volatile aromatics and minimize any deterioration of the aromatics. After the extraction, an inert gas, such as nitrogen or dry steam, is passed through the contents of the extractor and the gases or vapors are then passed through a charcoal bed, or the vapors may be condensed to form a liquid which is percolated through a bed of charcoal to trap the aromatics.

In still another manner of extraction the extractor is closed, but vented for outward flow, and during the brewing or extracting of the coffee the initial vapors are expelled through the vent and condensed. With an efficient operation usually about 6 percent of the water in the extractor provides ample condensate recovery for this step. The condensate may be percolated through a bed of charcoal.

Or, in a further modification, using a closed extractor which is vented, vapors expelled through the vent are passed directly through a charcoal bed. Vapors equivalent to 4 to 6 percent of the water added for extraction are usually sufficient to give a satisfactory volatile-aromatic recovery for this step.

The final portion of the volatile aromatics that may be recovered in the present process is that evolved during any concentrating practiced in the preparation of the final product, whether it is a liquid extract or a dry ultimate product. When a concentrating evaporator is used, the vapors coming from the concentrating evaporator are passed through a charcoal bed within 30 seconds after being released. Vapors equivalent to 6 to 10 percent of the total moisture to be removed during the concentrating are usually sufficient to give a satisfactory volatile-aromatic recovery at this step. Or, the initial vapors coming from the evaporator may be fractionated and condensed to form a distillate. With efficient fractionation, 6 to 10 percent of the total water to be removed in the concentrating is ample distillate recovery. The distillate is percolated through a bed of charcoal.

While it is hoped not to be bound by any specific theoretical explanation for the enhanced flavor and aroma of the coffee prepared from concentrates produced in accordance with this invention, it is believed that the volatile aromatics evolved at each stage of the processing (roasting, grinding, extraction and concentration) may not be identical and that in order to recapture the full-bodied coffee flavor and aroma, it is desirable that the maximum possible amount of the several groups of vapors be sorbed as quickly as possible by charcoal and returned to the ultimate instant coffee product. It should be obvious, however, that the volatiles from any one stage, when returned to the product, would produce enhanced flavor and aroma.

In operating the process with a laboratory apparatus, it has been found that when coffee odors are detectable in the effluents from a charcoal bed or chamber, the charcoal is saturated with the volatile aromatics. Each of the charcoal beds and chambers is provided in duplicate, so that when a bed is saturated, a fresh bed is placed in line by simply throwing over a valve, so that no interruptions occur in processing when a batch of charcoal becomes saturated and must be solvent treated. Each chamber or bed should be as large as can be used without unduly restricting the flows of the gases, vapors, and distillates.

The saturated charcoal is then extracted with a suitable low-boiling point solvent. Ether or methylene chloride may be used, but it is preferred to use dichloromonofluoromethane, due to its low boiling point, and principally because the volatiles are not changed in any detectable degree in aroma or flavor. The extraction may be made by soaking the charcoal in the solvent with gentle agitation and then draining off the solvent. It is preferred, however, to extract the charcoal in a Soxhlet-type apparatus, which enables a more complete extraction and requires the minimum of solvent. The solvent is then distilled under fractionation and the residue consists of the coffee volatile aromatics in a highly concentrated form.

Thus in processing the charcoal which had taken up the aromatics from the grinding and extraction steps, as described above, the charcoal was transferred to a Soxhlet apparatus and an extraction was made for 2.5 hours using dichloromonofluoromethane or methylene chloride as a solvent. The syphon cycle on the Soxhlet apparatus was 4.0 minutes, so that 36 to 38 extractions were made on the charcoal in the 2.5 hour extraction period.

After the extraction of the charcoal, the methylene chloride or dichloromonofluoromethane was evaporated and a small amount of a highly pungent aromatic residue remained in the Soxhlet flask.

Instead of recovering the aromatics from the charcoal by solvent extraction as described above, it has also been found that the aromatics may be removed efficiently by subjecting the charcoal to steam under pressure and then condensing the steam to trap the aromatics. By using a minimum of steam at pressures sufficient to permit operation at about 250° F. in the charcoal chamber, distillates were produced with from 20–40 percent of aromatics, corresponding to a 6700 fold to 13400 fold increase over the 30 parts per million of aromatics in the average freshly prepared beverage coffee.

The concentrated volatile aromatics may be added directly to a liquid or a dry instant coffee; or the volatile aromatics may be diluted by being mixed with a portion of the Instant Coffee prior to adding it to the main batch, or the volatile aromatics may be mixed with freshly dehydrated anhydrous dextrose prior to addition to the instant coffee. In all cases the mixing of the volatile aromatics and the instant coffee should be conducted in a closed mixer in the presence of an inert gas such as nitrogen, preferably with a water-cooled jacket, for the lower the mixing temperatures, the lower will be the volatile-aromatic loss during mixing.

The highly pungent aromatic residue remaining in the Soxhlet flask was added to the weakest instant coffee commercially available. A panel of six coffee consumers considered the coffee beverage prepared from the fortified with the aromatics, markedly superior in flavor and aroma as compared to a coffee beverage prepared from the unfortified instant coffee.

In operating a plant processing 100,000 pounds of coffee beans a day and recovering the aromatics at all four steps as indicated above, eight charcoal chambers and about 42 inches long and 10 inches in diameter and each containing about 50 pounds of charcoal would appear to suffice.

In the process described above, the several aromatic fractions which are recovered and returned to the instant coffee product were derived from the same source, but it will be readily appreciated that it is equally feasible and may often be even more desirable to add aromatics recovered from other coffees in process. For example, many manufacturers of instant coffee are also packers of regular coffee, and it would be relatively simple to recover the aromatics lost during the processing of the regular coffee by using activated charcoal in the manner described by me, and thereafter adding the aromatics recovered from the "regular coffee" to the instant coffee.

From the foregoing it will be evident that my invention has many other applications and it is not intended to limit my invention except as set forth in the following claims.

I claim:

1. In a process for preparing a concentrate of an aromatic containing material selected from the group consisting of coffee, tea and cocoa, wherein the preparation of the concentrate includes at least one conventional processing step wherein volatile aromatics are released from the material being processed; the improvement which comprises: recovering the released volatile aromatics from at least one such conventional processing step in a porous activated charcoal adsorbent solid prior to deterioration of said aromatics, extracting the recovered aromatics from said charcoal solid with a solvent having a boiling point between 32° F. and 110° F. and returning said extract to the concentrate produced as a result of said processing.

2. The process of claim 1 wherein the extraction is accomplished with a solvent selected from the group consisting of the chlorofluoromethanes, methylene chloride, ethyl chloride, and ethyl ether.

3. The process of claim 1 wherein the solvent is dichloromonofluoromethane.

4. The process of claim 1 wherein the aromatics are sorbed within one minute after release from each step.

5. The process of claim 1 wherein the solvent is methylene chloride.

6. The process of claim 1 including recovering said aromatics from the solvent by fractional distillation.

7. The process of claim 1 including recovering said aromatics from the solvent by evaporation.

8. The process of claim 1 including returning said extract to the concentrate under an inert gas.

9. The process of claim 1 wherein the concentrate is dried before the aromatics extracted from the charcoal have been added to the concentrate and the aromatics are then added to the solid concentrated extract.

10. The process of claim 1 including drying to a solid the concentrate before adding the aromatics to the concentrate, separating said aromatics from the solvent and adding said aromatics to the solid concentrate.

11. The process of claim 10 wherein said solvent is selected from the group consisting of chlorofluoromethanes, methylene chloride, ethyl chloride and ethyl ether.

12. The process of claim 11 wherein the aromatics are adsorbed by charcoal within one hour after release from said aromatic containing material.

13. The process of claim 12 wherein the solvent is dichloromonofluoromethane.

References Cited

UNITED STATES PATENTS

| 1,367,725 | 2/1921 | Trigg | 99—71 |
| 1,930,257 | 10/1933 | Stelkens | 99—65 |
| 2,773,774 | 12/1956 | McCarthy et al. | 99—205 |
| 2,998,316 | 8/1961 | Reich | 99—71 |

MAURICE W. GREENSTEIN, *Primary Examiner.*

U.S. Cl. X.R.

99—65, 71, 77, 140